March 4, 1952 — J. E. CLELAND — 2,587,596
HYDROLYSIS PROCESS
Filed Feb. 11, 1950
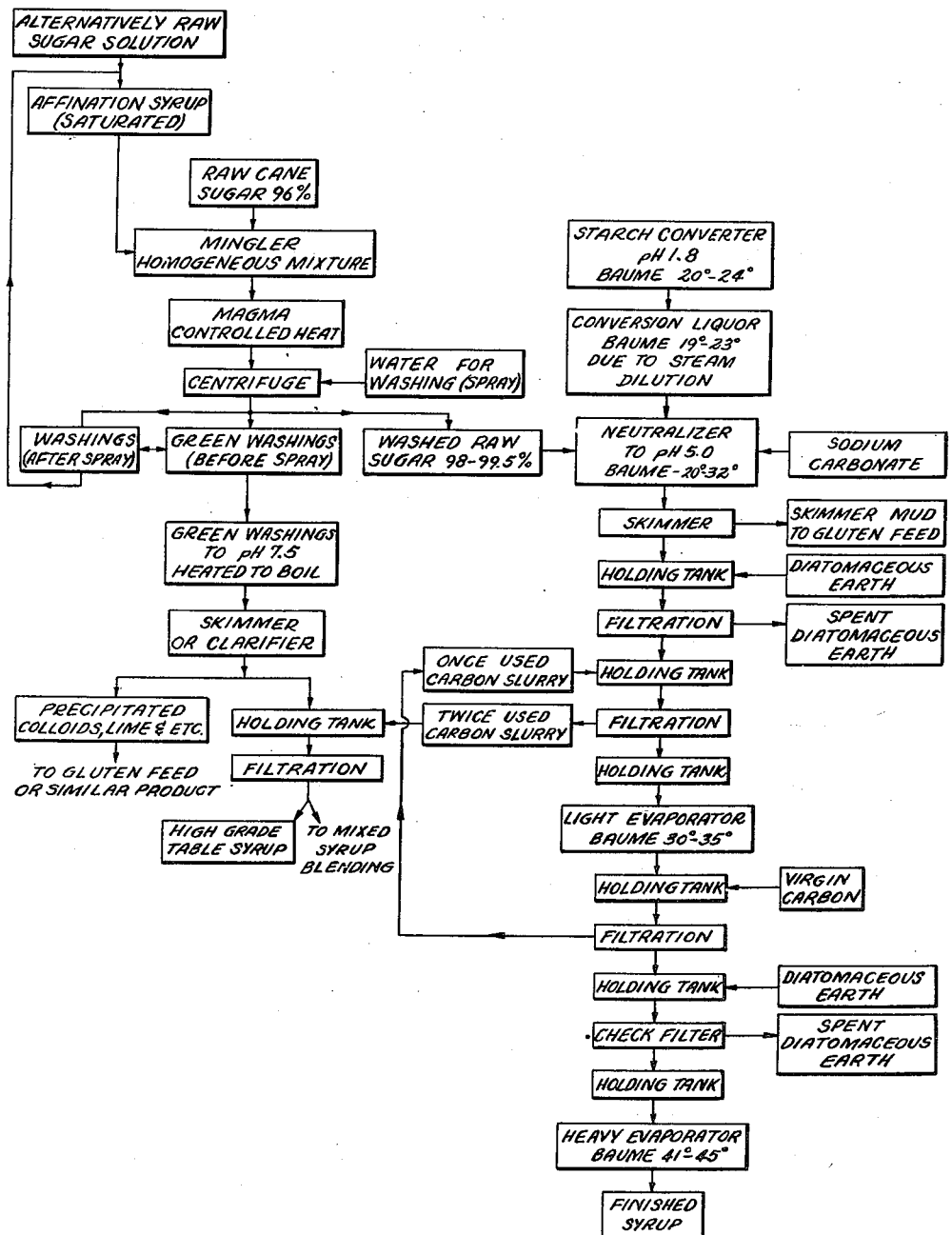
INVENTOR.
James E. Cleland
BY Greene & Durr
ATTORNEY

UNITED STATES PATENT OFFICE 2,587,596

HYDROLYSIS PROCESS

James Edwin Cleland, Granite City, Ill., assignor to Union Starch & Refining Company, Columbus, Ind., a corporation of Indiana Application February 11, 1950, Serial No. 143,785

5 Claims. (Cl. 127—41)

My invention relates to a process for hydrolysis of different materials in successive stages and more particularly my invention relates to a process in which there is consecutive or a partially concurrent hydrolysis of a starch as from corn and a second carbohydrate material so as to produce a hydrolyzed syrup and a subsequent purification of the syrup to produce an edible product having a greater sweetness than that produced by hydrolysis of starch alone.

This application is a continuation in part of my application No. 591,414 filed May 1, 1945, now abandoned.

Syrups made by acid hydrolysis of starch are produced to the extent of hundreds of millions of pounds annually from corn, potato and other starches. The major portion of these syrups is used by manufacturers of foods such as candy, bakery products, ice cream, jams, jellies and innumerable other products. A substantial portion, however, is used as a major ingredient in mixed table syrups for direct consumption as a sweetening and flavoring agent. Mixed syrups are commonly made from starch hydrolysis syrups such as corn syrups or commercial glucose to which have been added sucrose or sucrose syrups in various forms with flavors or naturally flavored syrups such as maple, sorghum, honey, cane, etc.

Although some syrups which are made by dual hydrolysis of starch from corn, i. e., acid hydrolysis followed by enzymatic hydrolysis are relatively sweeter and have found quite wide acceptance, most syrups made by the simple hydrolysis of starch are not considered sweet enough by themselves to be offered to the trade as table syrups. Hence it is common practice to increase the sweetness of this type of syrup by blending with various amounts of sucrose syrups. Some or all of the sucrose may be advantageously replaced by hydrolyzed sucrose syrup or invert syrup which consists of equal parts of dextrose and levulose or d-glucose and d-fructose. It is agreed generally that invert syrup is sweeter than sucrose syrup in the ratio of about 123:100 and there is a further advantage in that a chemical gain is obtained in the hydrolysis of the disaccharide sucrose to the monosaccharides d-glucose and d-fructose by the addition of one molecule of water to the products formed from each molecule of sucrose hydrolyzed.

Despite the widely recognized advantages of invert syrup as a sweetening agent for certain types of mixed syrups, sucrose is used to a very large extent in syrup mixing and invert syrup is used only to a relatively small extent. The reasons for this phenomenon appear to be largely economic because highly refined invert syrups are relatively expensive since extra processing is required to make them by hydrolysis from sucrose and the resulting product is a liquid which normally involves shipping of some water to the mixing plant, storage of liquid, etc. Hence it is often found that there is no advantage to the syrup mixer in buying invert syrup of the light colored, crystal clear grade desired because that invert syrup costs as much or more than the equivalent sweetening power when purchased as crystalline sucrose.

Most of the producers of commercial glucose or starch hydrolysis syrups also manufacture mixed table syrups. High grade invert syrup from sucrose would be very valuable to them as a sweetening agent for their mixed syrups but the quantity they require does not warrant carrying on sucrose refining and hydrolysis as an independent process with separate equipment, etc. It would be too small an operation to be economical and the advantages to be gained by simple hydrolysis of a highly refined and correspondingly high priced crystalline sucrose for increase in sweetening power and chemical gain in solids is scarcely attractive enough economically to warrant it as an independent operation although it is useful in some cases.

It is the object of this invention to utilize the differences in the hydrolysis properties of different materials to advantageously conduct their hydrolysis in successive stages but in the same system.

It is a further object of this invention to provide a novel process under which the step of hydrolyzing a readily hydrolyzed carbohydrate material is superimposed upon the primary step of hydrolyzing a material more resistant to hydrolysis.

It is the further object of this invention to utilize the excess heat and catalyst now wasted in the ordinary hydrolysis process, to effect hydrolysis of the added hydrolyzable material.

It is a further object of this invention to provide a novel process for making an extra sweet syrup.

It is a further object of this invention to provide new products by jointly or consecutively hydrolyzing different materials in the same system.

Still another object of the invention is to provide a process which combines the steps of hydrolyzing and at least one or more of the steps of purifying two or more different carbohydrate materials.

The objects of my invention are accomplished by pursuing the ordinary process of hydrolysis of a substance such as a starch by acid and heat and then before the step of neutralization is begun, at least one additional carbohydrate material which is more easily hydrolyzed for example, sucrose, is introduced so that the acid and heat used to hydrolyze the starch effects the hydrolysis of the additional carbohydrate. The resulting syrup mix containing the hydrolysis products of starch and at least one other carbohydrate is then further purified as by skimming, filtering, decolorizing and concentrated to the desired viscosity.

In a preferred variation of the general process the added carbohydrate is freshly washed raw sugar. This sugar is obtained from raw sugar which is separately treated substantially simultaneously with the preliminary hydrolysis of the starch and is introduced in its partially treated condition to the hydrolyzed starch solution. The subsequent treatment of the combined hydrolyzed syrups serves to complete the treatment of the sucrose component of the syrup as well as the starch component.

Other polysaccharides which are more easily hydrolyzed than starch may be added in place of some or all of the sugar and these polysaccharides may be in their completely reformed or partially refined state. For example, sucrose, inulin, turanose, lactose and similar polysaccharides may be added alone or in combination to the starch hydrolysis liquor. The polysaccharides which are added should be mixed and stored with the starch conversion liquor for a sufficient length of time to invert or hydrolyze to the extent considered desirable for the end usage contemplated.

The added carbohydrate, for example sucrose, is usually the more expensive component and therefore it is not ordinarily feasible to add more than 40% of the second component.

The novel features characteristic of this invention are set forth with particularity in the appended claims. The invention, itself, however, both as to its organization and its method of operation, together with additional objects and advantages thereof, will best be understood from a consideration of the examples below, which are given by way of illustration, and from the following description when read in connection with the accompanying drawing in which:

The figure is a representation of a flow sheet of a preferred form of the invention.

The general process of the invention can be understood by considering the upper right hand part of the drawing starting with the starch converter.

A starch suspension of 10 to 24° Bé. at 100° F. is hydrolyzed in the normal manner by adjusting the pH within the range of 1.4 to 1.8 by addition of the necessary quantity of acid, preferably hydrochloric acid, and subjecting the acidified suspension to a temperature corresponding to 20 to 50 lbs. steam pressure in a reaction vessel or converter until the reducing sugars content is in the range 35 to 57% (calculated as dextrose on total solids basis). The liquor which may have a slightly lower viscosity due to the addition and condensation of steam is then released to the neutralizer or vessel in which neutralization of the acid is usually carried out. In ordinary practice it is the custom to add sufficient of a solution of a base, such as sodium carbonate, to adjust the pH of the liquid to the isoelectric point of the fats and proteins which are present in the starch. Usually the addition of the basic solution is started as soon as the liquid is released to the neutralizer and continued until a pH in the range of 4.6 to 5.4 is attained or until the protein and fats have reached a condition of maximum coagulation. The liquid carrying the coagulated matter is discharged from the neutralizer to a skimmer tank where the floc which floats is skimmed off the top by mechanical means. The cycle of operations is so timed that the flow of neutralized liquor through the skimmer tank is continuous although the steps of hydrolysis and neutralization are conducted on a batch system.

In the practice of this invention the material which is more easily hydrolyzed, sucrose in this example, is introduced before the step of neutralization is begun and sufficient time is permitted to allow hydrolysis to go to completion before the neutralizing basic solution is added. A convenient method of doing this is to run the required quantity of sucrose solution into the neutralizer before the liquor is released from the convertor or to add either the solution or crystalline sucrose simultaneously. The starch hydrolysis liquor issuing from the convertor is very hot and at a pH which is usually in the range of 1.4 to 1.8 so that the sucrose is very rapidly dissolved and hydrolyzed. Hence the only change introduced into the normal starch processing is to delay the addition of the basic solution long enough to allow the sucrose to hydrolyze. This can be arranged so as not to decrease the rate of production as there is normally a considerable holding or storage period in the neutralizer which is ample not only to permit hydrolysis to be accomplished but to carry out the neutralization satisfactorily. The solution now contains the hydrolysis products of both starch and sucrose in the desired proportions and it goes to the skim tank and through the refining process just as the normal starch hydrolysis product alone.

It is believed desirable to stress the advantages of the stepwise features of the hydrolysis procedure. Much experimental work in development of the process clearly demonstrates the fact that it is advisable to conduct the hydrolysis in successive stages of a continuous operation. By that it is meant that the carbohydrate offering greatest resistance to hydrolysis should be acted upon first under sufficiently high temperatures and concentration of acid as to accomplish an efficient hydrolysis reaction to the desired extent. Then the reaction conditions are modified sufficiently to hydrolyze one or more other carbohydrates in a suitable manner while avoiding conditions likely to give rise to undesirable side reactions.

An excellent experimental illustration of the desirability of the stepwise process may be observed in the case of hydrolysis of starch in the primary stage followed by hydrolysis of sucrose in the neutralizer as the secondary stage. When carried out in this manner the resulting produce has very desirable properties. While it may seem possible, on casual consideration, to properly accomplish the hydrolysis of the starch and sucrose together or concurrently in the conventional starch convertor or pressure vessel, this latter assumption, however, is seriously in error since the conditions of heat and acidity which will efficiently hydrolyze starch are too severe for sucrose and will cause reversion and unwanted side reactions giving rise to excessive color and bitter, unpleasant tasting or otherwise undesirable by-products. Among the latter were found compounds of the furfural type such as oxymethylfurfural and hydroxymethylfurfural. The presence of such undesirable end-products may be demonstrated simply, for example, by extraction and testing of the extract with an acidified solution of resorcinol which brings about the development of a pronounced reddish color when appreciable quantities of the furfural compounds are present.

Hence it is desirable to modify the reaction conditions very appreciably before the addition of the secondary carbohydrates if these are less resistant to hydrolysis than the material used in the primary stage. In the case above cited involving starch in the primary stage followed by sucrose in the secondary it is convenient to add the sucrose in the neutralizer where the temperature cannot exceed the boiling point of the reaction mixture under atmospheric pressure. At this stage the reaction conditions can be modified to any desired extent by allowing the liquid to cool to a suitable temperature and by partial neutralization of the acidity if required. It is apparent that manipulation of these factors can be so conducted as to give rise to conditions capable of bringing about inversion or hydrolysis of sucrose over a wide range from only a slight degree to above 90% of completion. Experiment has demonstrated that it is undesirable to attempt to cause the hydrolysis to go too far as reversion is likely to result.

It will be obvious to those skilled in the practice of hydrolysis that it would be possible to accomplish similar results in the convertor or pressure vessel by releasing the pressure after suitable hydrolysis of the starch or other carbohydrate and introduction of sucrose, etc., when the temperature had been lowered to a desirable level so as not to damage the carbohydrate used in the secondary stage. While such practice would be hydrolysis in successive steps of a continuous process and hence within the scope of this invention it is not to be considered as preferred embodiment of my invention because unnecessary complications would be introduced both in equipment and procedure.

The syrup which results from the neutralization is still not adapted for table use, for example, it is not concentrated enough and it contains many undesirable impurities. The syrup mixture is therefore purified by skimming which removes fat, precipitated protein and other impurities, then further purified by absorption and filtration steps and evaporated or concentrated in one or several separate steps. The exact order or number of the filtration, absorption and concentration steps is not critical but such purification steps are essential to the production of a palatable syrup of proper consistency.

According to a preferred process the added carbohydrate is washed raw cane sugar prepared as shown on the left hand side of the drawing. The raw cane sugar containing 96% of sugar is introduced into a mingler together with a sugar solution obtained by dissolving raw sugar or from the washings of the previously treated sugar. This sugar and water mixture is heated and centrifuged in a conventional manner to a 99% purity or higher and washings syrup which are treated separately as illustrated in the flow sheet. The washed raw sugar of 98-99% purity or higher, is introduced directly to the neutralizer which contains the conversion liquor from the starch hydrolysis process. The latter liquor is, of course, adjusted to the proper pH and temperature before the washed raw sugar is added.

After the conversion of the sugar has taken place the pH of the combined syrup is adjusted to 5.0 and the said syrup is fed to a skimmer. Not only are precipitated colloidal materials such as fat and proteins resulting from the starch component removed by this process but any similar impurities which come from the washed raw sugar are also removed. Similarly the combined syrup containing color and impurities from both the starch and raw cane sugar is subjected to the subsequent purification steps which as shown in the drawing may comprise, the addition of diatomaceous earth and filtration; the addition of once-used carbon slurry and filtration; a preliminary evaporation; the addition of virgin carbon and subsequent filtration; the addition of diatomaceous earth and filtration; and the final evaporation to a syrup having a concentration of 41°–45° Bé.

*Example 1*

Very satisfactory results were achieved when the process of this invention was carried out with the carbohydrates starch and sucrose specifically as follows:

The starch suspension (2250 gallons at 22° Bé. at 100° F. containing 20 lbs. of 20° Bé. commercial hydrochloric acid) was introduced into the convertor which contained 150 gallons of water acidified with an additional 20 lbs. of 20° Bé. commercial grade hydrochloric acid. Live steam was blown into the convertor in the conventional manner while the starch was being fed in. The conversion proceeded according to common practice at 40 p. s. i. until the type sample indicated hydrolysis to a syrup of 55 dextrose equivalent whereupon the batch was blown to the neutralizer as usual. The pH of the liquor was observed to be 1.6. The air was turned on in the netralizer as in regular practice and the liquid was allowed to agitate until the temperature dropped to 210° F. Six hundred pounds of dry sucrose (turbinado) was then dumped into the liquid in the neutralizer and agitation continued for 10 minutes. A determination of reducing sugars then indicated that the sucrose had been inverted or hydrolyzed to the extent of more than 90% and the mixture was then neutralized by the addition of approximately 20 lbs. of sodium carbonate in 55 gallons of water. The resulting pH was 4.8. The syrup which still has a rather low concentration of approximately 22° Bé. is then released to a skim tank where the coagulated fats, proteins, etc., are skimmed off. Thereafter diatomaceous earth is added and the syrup is filtered. Preferably the syrup is filtered and then treated with absorbent material such as activated carbon while it is still of a relatively low concentration. It is thereafter preliminarily concentrated at 30-35° Bé. treated with virgin carbon, filtered and again filtered with the addition of diatomaceous earth. Thereafter the syrup is concentrated to the desired final concentration which is usually about 38–40° Bé. for table syrup and 43° to 45° Bé for sweet syrups useful in some types of confectionery manufacture.

While the above procedure gives excellent results with sucrose it has been found desirable to modify conditions when superimposing the hydrolysis of inulin and other carbohydrates upon that of starch. The carbohydrates from the Jerusalem artichoke, which yield levulose when hydrolyzed, are more easily heat damaged than is sucrose. When these materials are added it is preferred practice to cool to about 200° F. and partially neutralize to a pH of about 2.0 before introducing the carbohydrate into the neutralizer. The holding time may be reduced also to advantage. If desired, a three step process can be employed in which 300 lbs. instead of 600 lbs. of sucrose is added when the temperature of the hydrolyzed starch is reduced to 210° F. and the temperature of the mix is allowed to cool down to 200° F. whereupon sufficient sodium carbonate is added to impart a pH of 2.0 to the mix and 100 lbs. of inulin are added.

Example 2

According to a preferred process the sucrose is obtained from raw cane sugar and is hydrolyzed in the starch conversion process before it is completely refined as illustrated in the drawing. The raw cane sugar, containing about 96% of sugar, is transferred together with some saturated sugar solution (preferably circulated from a previous treatment) to a mingler. This mixture is agitated and heated to obtain a homogeneous magma consisting of crystals in a slightly supersaturated syrup and washed. 300 lbs. of this washed cane sugar is then added to the neutralizer containing 2250 gallons of the hydrolyzed starch solution at a temperature of 210° F. and a pH of 1.6 and the mixture is agitated in any desired way. The combined syrup is then treated as in Example 1 and the impurities resulting from the addition of the sucrose are removed simultaneously with the impurities resulting from the hydrolyzed starch component.

It will be apparent to those skilled in the art that the method of my invention effects a number of important advantages in processing aside from those already recited. Outstanding among these is that a sucrose material need not be highly refined for use in this process. It goes through the refining operation along with the starch liquor in any case and is refined with it. An important saving may be realized in this way. In addition to the raw sugar disclosed in Example 2, other comparatively crude sucrose products such as partially inverted yellow syrups, plantation whites, etc., may be successfully utilized and can be purchased at prices considerably below the refined sugars or syrups which are necessary for syrup mixing when carried out in the customary manner. Another important advantage arises from the fact that more concentrated solutions can be handled in the early refining stages.

In normal manufacture of starch hydrolysis syrups the concentration of the hydrolysis liquor is limited by the fact that it is practical to hydrolyze starch suspensions only up to a certain concentration which is in the neighborhood of 24° Bé. (100° F.). Above this concentration the pasted starch becomes too difficult to handle in the convertor and the equilibrium of the desired products with those resulting from reversion becomes unfavorable quite early in the reaction. As hydrolysis proceeds, however, the fluidity of the solution is increased and more solids can be handled to advantage in a liquid volume which is not substantially expanded when materials such as sucrose, are introduced either dry or as concentrated solution according to the preferred practice of this invention. This fact tends to compensate for the handling of more dry subsubstance. Another advantage appears when additional solids are added by inclusion of the secondary hydrolysis at the neutralizer as the flocculated materials tend to rise to the surface more readily in the liquor of higher concentration and are more efficiently removed in the skimmer operation.

Yet another advantage resulting from this invention is the fact that syrup mixing is eliminated as a final step in the manufacture of certain types of syrup. This is advantageous because separate equipment is no longer needed for this purpose and the syrup is ready for packing on a continuous basis as it issues from the refinery without necessity for storage of finished ingredients, melting, reheating, diluting and all the steps practiced of necessity when mixing two finished products such as commercial corn syrup and sugar.

The scope of this invention is not confined to application to the carbohydrates named above in recital of a typical example. A general principle is embraced in that the invention is applicable to any two or even more materials which may be advantageously processed to make useful products by hydrolysis and which have different hydrolyzing characteristics. In general it is necessary only to have two products which have different rates of hydrolysis and characteristics which are desirable in a single product. Then it is apparent that a primary hydrolysis may be carried out in the material which is more difficult to hydrolyze and a secondary hydrolysis of the more easily hydrolyzed product may be superimposed to advantage with increased efficiency in processing resulting because no more catalyst is required than in the primary hydrolysis, less costly raw material may be used, more concentrated liquids are handled, heat economies result, equipment is reduced to a minimum and batch mixing of finished products is avoided. In addition the hydrolysis of the minor constituents often becomes commercially feasible in cases where a separate process would be impractical because of small volume. In most cases also the easier hydrolyzed material is purified and improved as to color by the starch syrup refining steps which according to this invention, are applied to the combined syrup.

A number of other useful applications of the invention will be apparent to those skilled in the practice of hydrolysis. Among these and by way of further illustration may be cited another case as follows:

Example 3

Starch is hydrolyzed in the primary step and in the customary manner as already recited above. The material introduced for secondary hydrolysis may be crude inulin which is a carbohydrate which may be prepared in large quantities from the Jerusalem artichoke, dahlia bulbs, etc. This carbohydrate hydrolyzes very readily in slightly acidulated solutions and the product of hydrolysis is d-fructose or levulose which is an exceedingly sweet sugar and valuable as a sweetening agent. Many attempts and much effort have gone into work devoted to making inulin a commercially practical source of levulose or d-fructose. Some progress has been made toward this end and methods have been devised for producing a refined levulose syrup and even a crystalline levulose. No sustained commercial production from this source has been built up, however, as there are many economic disadvantages inherent in an operation which is necessarily on a small scale at the start and where the technology must be developed as a separate art. The outlook for utilization of this product is brightened when inulin is considered as a minor ingredient or adjunct, that is, as a source of levulose to increase the sweetness of the starch hydrolysis syrup. Thus, by the process of my invention, the crude inulin may be hydrolyzed and refined right along with the major corn starch constituent. When inulin is the raw material for the secondary hydrolysis a partial neutralization may be carried out on the starch hydrolysis syrups before introduction of the inulin. The latter material hydrolyzes more readily than does sucrose and its sweetening power is greater as d-fructose or levulose is produced whereas sucrose gives rise to only 50% of levulose and 50% of d-glucose or dextrose. The sweetening power is generally considered to be in the ratio of approximately 175:123. Hence a ready large scale market is available for inulin and a means to process it on a commercial scale through application of this invention. The high ash content characteristic of crude inulin from sources such as the Jerusalem artichoke may be eliminated very satisfactorily by application of ion exchange to the crude inulin solution or to the combination after hydrolysis. Ion exchange treatment is now widely practiced as a step in refining of corn syrup.

Many other pairs or combinations of carbohydrates lend themselves to processing through the methods of this invention and a number of useful and novel products may be produced by this means. Thus, lactose and sucrose or inulin, for instance, may be subjected to the process or a mixture of starch and lactose plus sucrose and inulin may be employed.

It is not intended to confine the scope of this invention to the field of carbohydrates. It can be applied with equal success to proteins and many other categories of natural or synthetic materials.

The preferred applications cited above are not to be construed as given by way of limitation but it is apparent that there can be considerable flexibility in processing while remaining within the scope of the invention. The secondary hydrolysis can be conducted in the convertor or hydrolysis reaction vessel itself if advantageous to do so as additional material can be introduced under pressure or the whole hydrolysis operation may be conducted in open vessels.

The process of this invention provides a continuous operation which gains certain manufacturing savings and advantages by full utilization of the catalysts, equipment, materials, labor and elimination of certain steps such as mixing duplicate refining steps etc. The process is applicable to those cases where the hydrolysis products of the different materials are required in the finished product or where they may be added advantageously.

I claim:

1. A continuous process for producing an extra sweet syrup which comprises acidifying a corn starch suspension to a pH of 1.4–1.8, heating the acidified suspension to a temperature corresponding to 20–50 lbs. of steam pressure to hydrolyze the starch and produce a corn syrup, decreasing the hydrolyzing potential of said acidified composition by a procedure which includes discontinuing the heating and reducing the pressure on the composition to atmospheric pressure, adding a readily hydrolyzed carbohydrate to the heated, acid-containing, corn syrup so that the residual heat and acid of said hydrolysis mixture effects the hydrolysis of the carbohydrate, the hydrolysis product of said carbohydrate substance increasing the sweetness of the hydrolyzed corn syrup, thereafter neutralizing the syrup, and refining and concentrating the mixed syrup.

2. A continuous process for producing an extra sweet syrup which comprises acidifying a corn starch suspension to a pH of 1.4–1.8, heating the acidified suspension to a temperature corresponding to 20–50 lbs. of steam pressure to hydrolyze the starch and produce a corn syrup, decreasing the hydrolyzing potential of said acidified composition by a procedure which includes discontinuing the heating and reducing the pressure on the composition to atmospheric pressure after the starch is hydrolyzed to a syrup having a dextrose equivalent of 35–57%, adding sucrose to the heated, acid containing, corn syrup so that the residual heat and acid of said hydrolysis mixture effects the hydrolysis of the sucrose, the hydrolysis product of said sucrose increasing the sweetness of the hydrolyzed corn syrup, thereafter neutralizing the syrup and refining and concentrating the mixed syrup.

3. A continuous process for producing an extra sweet syrup which comprises acidifying a corn starch suspension to a pH of 1.4–1.8, heating the acidified suspension to a temperature corresponding to 20–50 lbs. of steam pressure to hydrolyze the starch and produce a corn syrup, decreasing the hydrolyzing potential of said acidified composition by discontinuing the heating, reducing the pressure to atmospheric pressure, cooling down to at least about 200° F. and partially neutralizing the composition to a pH of about 2.0, adding inulin to the heated, acid-containing, corn syrup so that the residual heat and acid of said hydrolysis mixture effects the hydrolysis of the inulin, the hydrolysis product of said inulin increasing the sweetness of the hydrolyzed corn syrup, thereafter neutralizing the syrup, and refining and concentrating the mixed syrup.

4. A continuous process for producing an extra sweet syrup which comprises providing an acid-hydrolyzed starch conversion liquor containing unneutralized acid from the conversion step, providing a freshly washed and affinated raw sucrose, adding a minor amount of said affinated raw sucrose to the acid-containing starch conversion liquor and thoroughly mixing and storing the resultant liquor until at least a substantial portion of the sucrose has been inverted, neutralizing the resultant syrup to a pH of 4.5 to 5.5 whereby certain non-sugar impurities are coagulated, skimming off the coagulated materials, further refining the combined syrup while it is still of a relatively low concentration and concentrating the combined syrup.

5. A continuous process for producing an extra sweet syrup which comprises providing an acid-hydrolyzed starch conversion liquor containing unneutralized acid from the conversion step with a viscosity of 19–23° Bé., providing a freshly washed and affinated raw sucrose, adding said affinated raw sucrose to the acid-containing starch conversion liquor and thoroughly mixing and storing the resultant liquor until at least a substantial portion of the sucrose has been inverted, the amount of sucrose added being insufficient to increase the gravity of the resultant syrup to more than 32° Bé., neutralizing the resultant syrup to a pH of 4.5 to 5.5 whereby certain non-sugar impurities are coagulated, skimming off the coagulated materials, filtering the dilute syrup in the presence of a decolorizing agent, and thereafter preliminarily concentrating, further refining and finally concentrating the syrup to a viscosity of 41–45° Bé.

JAMES EDWIN CLELAND.

REFERENCES CITED

The following references are of record in the file of this patent:

UNITED STATES PATENTS

| Number | Name | Date |
| --- | --- | --- |
| 166,090 | Garton | July 27, 1875 |